US009985856B2

(12) United States Patent
Liu et al.

(10) Patent No.: US 9,985,856 B2
(45) Date of Patent: May 29, 2018

(54) METHOD, APPARATUS AND SYSTEM FOR MEASURING NETWORK PACKET LOSS

(71) Applicant: HUAWEI TECHNOLOGIES CO., LTD., Shenzhen, Guangdong (CN)

(72) Inventors: Hongming Liu, Beijing (CN); Wei Fang, Beijing (CN); Yanjun Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 14/670,905

(22) Filed: Mar. 27, 2015

(65) Prior Publication Data
US 2015/0200828 A1    Jul. 16, 2015

Related U.S. Application Data

(63) Continuation of application No. PCT/CN2013/077291, filed on Jun. 17, 2013.

(30) Foreign Application Priority Data

Sep. 29, 2012    (CN) .......................... 2012 1 0374881

(51) Int. Cl.
*H04L 12/26*    (2006.01)
*H04W 56/00*    (2009.01)
*H04L 29/12*    (2006.01)

(52) U.S. Cl.
CPC ...... *H04L 43/0829* (2013.01); *H04L 43/0876* (2013.01); *H04W 56/002* (2013.01); *H04L 61/6063* (2013.01)

(58) Field of Classification Search
CPC ................................................. H04L 43/0829
See application file for complete search history.

(56) References Cited

U.S. PATENT DOCUMENTS 6,947,427 B1 * 9/2005 Rokugo ................. H04L 29/06
370/395.5
7,447,213 B2 * 11/2008 Busi ....................... H04L 12/46
370/395.5
(Continued)

FOREIGN PATENT DOCUMENTS

CN    101056215 A    10/2007
CN    101383737 A    3/2009
(Continued)

OTHER PUBLICATIONS

R. Braden, Editor, Requirements for Internet Hosts—Communication Layers, Network Working Group Internet Engineering Task Force, RFC1122, Oct. 1989. total 116 pages.
(Continued)

*Primary Examiner* — Parth Patel
(74) *Attorney, Agent, or Firm* — Huawei Technologies Co., Ltd.

(57) ABSTRACT

Provided are a method, apparatus and system for measuring network packet loss, the method includes: acquiring data packet measurement information measured by at least one target logical port to a traffic stream, transmitting the data packet measurement information to a measurement control point, so that the measurement control point determine the condition of network packet loss according to the data packet measurement information. As a data collecting point acquires the data packet measurement information measured by at least one target logical port to the traffic stream, and uniformly transmits the data packet measurement information to the measurement control point, when multiple target logical ports respectively perform measurement to acquire respective data packet measurement information, the measurement control point uniformly determines condition of packet loss of the traffic stream. Therefore, accurate packet loss measurement can be performed on the traffic stream (Continued)

under the scenario of point-to-point, point-to-multipoint or multipoint-to-multipoint networks.

13 Claims, 7 Drawing Sheets

(56) References Cited

U.S. PATENT DOCUMENTS

| | | | | |
|---|---|---|---|---|
| 7,457,868 | B1* | 11/2008 | Guo | H04L 12/2602 709/203 |
| 7,940,658 | B2* | 5/2011 | Foschiano | H04L 41/0886 370/230 |
| 9,154,634 | B2* | 10/2015 | Wiley | H04L 29/06027 |
| 9,621,361 | B2* | 4/2017 | Bugenhagen | H04L 12/14 |
| 2002/0038385 | A1* | 3/2002 | Kalliokulju | H04L 29/06 709/247 |
| 2004/0240431 | A1 | 12/2004 | Makawski et al. | |
| 2005/0163131 | A1* | 7/2005 | Tonnby | H04L 12/185 370/395.53 |
| 2006/0239287 | A1* | 10/2006 | Johnsen | H04L 45/566 370/412 |
| 2007/0033641 | A1* | 2/2007 | Chu | H04L 63/0218 726/6 |
| 2007/0089161 | A1* | 4/2007 | Waris | H04L 41/0893 726/1 |
| 2007/0147437 | A1* | 6/2007 | Yasui | H04L 1/1854 370/519 |
| 2007/0162909 | A1* | 7/2007 | Bahl | G06F 9/468 718/104 |
| 2007/0223479 | A1* | 9/2007 | Yoshii | H04L 41/0893 370/392 |
| 2008/0080390 | A1* | 4/2008 | Ebuchi | H04L 43/12 370/253 |
| 2008/0095153 | A1* | 4/2008 | Fukunaga | H04L 43/028 370/389 |
| 2008/0112439 | A1* | 5/2008 | Vestal | H04J 3/0661 370/516 |
| 2008/0123560 | A1* | 5/2008 | Nassor | H04L 1/0017 370/255 |
| 2008/0159300 | A1* | 7/2008 | Ban | H04L 12/437 370/400 |
| 2008/0192764 | A1* | 8/2008 | Arefi | H04L 47/10 370/412 |
| 2008/0243770 | A1* | 10/2008 | Aasman | G06F 17/30587 |
| 2009/0161566 | A1 | 6/2009 | Sridhar et al. | |
| 2009/0161569 | A1* | 6/2009 | Corlett | H04L 43/08 370/252 |
| 2009/0245099 | A1* | 10/2009 | Tsuchiya | H04L 45/02 370/221 |
| 2009/0285093 | A1* | 11/2009 | Bolt | H04L 41/0803 370/231 |
| 2009/0290572 | A1* | 11/2009 | Gonia | H04J 3/0641 370/350 |
| 2010/0278040 | A1* | 11/2010 | He | H04L 12/42 370/222 |
| 2011/0058576 | A1* | 3/2011 | Sun | H04J 3/0664 370/498 |
| 2011/0082910 | A1* | 4/2011 | Breslin | H04L 12/26 709/217 |
| 2011/0205919 | A1* | 8/2011 | Imai | H04L 45/127 370/252 |
| 2012/0033553 | A1* | 2/2012 | Strulo | H04L 47/10 370/232 |
| 2012/0136615 | A1* | 5/2012 | Krzanowski | H04L 41/5003 702/122 |
| 2013/0088994 | A1 | 4/2013 | Guo et al. | |
| 2014/0226514 | A1 | 8/2014 | Zhou | |
| 2015/0036510 | A1* | 2/2015 | Bao | H04L 43/0811 370/241.1 |
| 2015/0207712 | A1* | 7/2015 | Fang | H04L 43/0852 370/252 |

FOREIGN PATENT DOCUMENTS

| | | |
|---|---|---|
| CN | 101605020 A | 12/2009 |
| CN | 101834665 A | 9/2010 |
| CN | 102025571 A | 4/2011 |
| CN | 102273136 A | 12/2011 |
| CN | 102404166 A | 4/2012 |
| CN | 102651702 A | 8/2012 |
| CN | 102946330 A | 2/2013 |
| EP | 2833574 A1 | 2/2015 |

OTHER PUBLICATIONS

K. Ramakrishnan et al, The Addition of Explicit Congestion Notification (ECN) to IP, RFC3168, Network Working Group, Sep. 2001, total 63 pages.

S. Shalunov et al, A One-way Active Measurement Protocol (OWAMP), RFC4656, Network Working Group, Sep. 2006, total 56 pages.

K. Hedayat et al, A Two-Way Active Measurement Protocol (TWAMP), RFC5357, Network Working Group, Oct. 2008, total 26 pages.

D. Frost et al, Packet Loss and Delay Measurement for MPLS Networks, RFC6374 Internet Engineering Task Force (IETF), Sep. 2011, total 52 pages.

D. Frost et al, A Packet Loss and Delay Measurement profile for MPLS-based transport Networks, RFC6375 Internet Engineering Task Force (IETF), Sep. 2011, total 5 pages.

D. Mills et al, Network Time Protocol Version 4: Protocol and Algorithms Specification, RFC5905, Internet Engineering Task Force (IETF), Jun. 2010, total 110 pages.

K. Nichols et al, Definition of the Differentiated Services Field (DS Field)in the IPv4 and in the IPv4 and IPv6 Headers, RFC2474, Network Working Group, Dec. 1998, total 20 pages.

ITU-T G.8013/Y.1731, Series G: Transmission Systems and Media, Digital Systems and Networks Packet over Transport aspects—Ethernet over Transport aspects Series Y: Global Information. Infrastructure, Internet Protocol Aspects and Next-Generation Networks Internet protocol aspects—Operation, administration and maintenance OAM functions and mechanisms for Ethernet based networksAmendment 1, May 2012, total 16 pages.

IEEE Std 1588™-2002, 1588TM IEEE Standard for a Precision Clock Synchronization Protocol for Networked Measurement and Control Systems, IEEE Instrumentation and Measurement Society Sponsored by the TC9—Technical Committee on Sensor Technology . . . Published by The Institute of Electrical and Electronics Engineers, Inc. Nov. 8, 2002. total 154 pages.

International Standard, Precision clock synchronization protocol for networked measurement and control systems, IEC 61588 First edition IEEE 1588™, Sep. 2004, total 158 pages.

IEEE Standard for a Precision Clock Synchronization Protocol for Networked Measurement and Control Systems, IEEE Instrumentation and Measurement Society Sponsored by the Technical Committee on Sensor Technology (TC-9), IEEE Std 1588™-2008(Revision of IEEE Std 1588-2002), Jul. 24, 2008, total 289 pages.

XP17464786, "operation(OEB_entity_ampersand) maintenance mechanism for MPLS networks;y.1711(Feb. 2004)", ITU-T standard. Feb. 12, 2004. total 36 pages.

* cited by examiner

METHOD, APPARATUS AND SYSTEM FOR MEASURING NETWORK PACKET LOSS

CROSS-REFERENCE TO RELATED APPLICATIONS

This application is a continuation of International Patent Application No. PCT/CN2013/077291, filed on Jun. 17, 2013, which claims priority to Chinese Patent Application No. 201210374881.4, filed on Sep. 29, 2012, both of which are hereby incorporated by reference in their entireties.

TECHNICAL FIELD

The present application relates to communication technologies, and more particularly to a method, an apparatus and a system for measuring network packet loss.

BACKGROUND

IP (an interconnection protocol between networks, Internet Protocol, IP)-based network has become a trend with continued advancements in network information technologies. Under this trend, how to conduct packet loss performance and quality evaluation to a service based on an IP protocol has become a more and more prominent problem.

The packet loss performance measurement defined for a multi-protocol label switching (Multi-Protocol Label Switching, MPLS) network in the prior art can achieve packet loss measurement of a service message by making packet loss statistics at network-sides of a network transmitting point and a receiving point.

However, since it is achieved based on a network upstream transmitting point and a network downstream receiving point in the prior art, packet loss measurement under the scenario of point-to-multipoint or multipoint-to-multipoint or other multipoint transmission on the upstream and downstream of the network cannot be performed in the prior art, and there is currently no method for measuring multipoint-to-multipoint network packet loss.

SUMMARY

Embodiments of the present application provide a method, an apparatus and a system for measuring network packet loss, so as to achieve packet loss measurement under the scenario of point-to-multipoint or multipoint-to-multipoint networks.

In an aspect, there is provided a method for measuring network packet loss, including:

acquiring data packet measurement information measured by at least one TLP to a traffic stream, where the data packet measurement information includes a measurement period identifier, a traffic stream identifier, a data packet count value and a TLP identifier;

transmitting the data packet measurement information to an MCP, so that the MCP determines the condition of network packet loss according to the measurement period identifier, the traffic stream identifier, the data packet count value and the TLP identifier.

Optionally, the acquiring data packet measurement information measured by at least one TLP to the traffic stream, can include:

acquiring, by a DCP for managing an upstream TLP, data packet transmission information measured by at least one upstream TLP to a transmitted traffic stream;

the acquiring data packet reception information measured by at least one TLP to the traffic stream, includes:

acquiring, by a DCP for managing a downstream TLP, data packet reception information measured by at least one downstream TLP to a received traffic stream.

Optionally, the acquiring, by the DCP for managing the downstream TLP, the data packet reception information measured by at least one downstream TLP to the received traffic stream, includes:

acquiring, by the DCP for managing the downstream TLP, the data packet reception information, after delaying with a preset duration by taking the time when a measurement period corresponding to the measurement period identifier arrives as a starting point.

In another aspect, there is provided a method for measuring network packet loss, including:

identifying a traffic stream according to traffic stream characteristic information, and determining whether the traffic stream is a target traffic stream;

if yes, counting a data packet of the traffic stream in a unit of a measurement period, and acquiring a data packet count value corresponding to a measurement period identifier;

determining data packet measurement information including the measurement period identifier, a traffic stream identifier, the data packet count value and a TLP identifier, so that a DCP transmits the data packet measurement information to an MCP after acquiring the data packet measurement information.

Optionally, the identifying the traffic stream according to traffic stream characteristic information, and determining whether the traffic stream is the target traffic stream, further can include:

identifying, by an upstream TLP, the traffic stream according to the traffic stream characteristic information, and determining whether the traffic stream is a target traffic stream;

before the counting the data packet of the traffic stream in a unit of the measurement period, the method further includes:

adding, by the upstream TLP, an identifier in the data packet of the traffic stream according to the current measurement period identifier;

the counting the data packet of the traffic stream in a unit of the measurement period, includes:

counting, by the upstream TLP, the data packet with an added different identifier by using a counter corresponding to the different identifier.

The identifying the traffic stream according to traffic stream characteristic information, and determining whether the traffic stream is the target traffic stream, includes:

identifying, by a downstream TLP, the traffic stream according to the traffic stream characteristic information, and determining whether the traffic stream is a target traffic stream.

Optionally, the adding the identifier in the data packet of the traffic stream, includes:

adding the identifier on a reserved digit of TOS or a reserved digit of Flags in an IP header of the data packet.

In still another aspect, there is provided a method for measuring network packet loss, including:

receiving data packet transmission information transmitted by a DCP corresponding to an upstream TLP and data packet reception information transmitted by a DCP corresponding to a downstream TLP, where the data packet transmission information and the data packet reception information include a measurement period identifier, a traffic stream identifier, a data packet count value and a TLP identifier;

determining the condition of network packet loss according to the measurement period identifier, the traffic stream identifier, the data packet count value and the TLP identifier in the data packet transmission information and the measurement period identifier, the traffic stream identifier, the data packet count value and the TLP identifier in the data packet reception information.

Optionally, the determining the condition of network packet loss according to the measurement period identifier, the traffic stream identifier, the data packet count value and the TLP identifier in the data packet transmission information and the measurement period identifier, the traffic stream identifier, the data packet count value and the TLP identifier in the data packet reception information, includes:

determining whether packet loss occurs in a traffic stream corresponding to the traffic stream identifier and the TLP identifier within a measurement period corresponding to the measurement period identifier, according to the data packet count value in the data packet transmission information and the data packet count value in the data packet reception information.

Optionally, the determining the condition of network packet loss according to the measurement period identifier, the traffic stream identifier, the data packet count value and the TLP identifier in the data packet transmission information and the measurement period identifier, the traffic stream identifier, the data packet count value and the TLP identifier in the data packet reception information, includes:

determining whether packet loss occurs in a traffic stream corresponding to the traffic stream identifier and the TLP identifier within a measurement period corresponding to the measurement period identifier, according to the data packet count value in the data packet transmission information, the data packet count value in the data packet reception information, a data packet count value in data packet transmission information of a previous measurement period, and a data packet count value in data packet reception information of the previous measurement period.

In an aspect, there is provided a DCP, including:

an acquisition module, configured to acquire data packet measurement information measured by at least one TLP to a traffic stream, where the data packet measurement information includes a measurement period identifier, a traffic stream identifier, a data packet count value and a TLP identifier;

a transmission module, configured to transmit the data packet measurement information to an MCP, so that the MCP determines the condition of network packet loss according to the measurement period identifier, the traffic stream identifier, the data packet count value and the TLP identifier.

Optionally, the DCP is a DCP for managing an upstream TLP;

the acquisition module is specifically configured to acquire data packet transmission information measured by at least one upstream TLP to the transmitted traffic stream;

or, the DCP is a DCP for managing a downstream TLP;

the acquisition module is specifically configured to acquire data packet reception information measured by at least one downstream TLP to the received traffic stream.

The DCP is a DCP for managing a downstream TLP;

the acquisition module is specifically configured to acquire the data packet reception information, after delaying with a preset duration by taking the time when a measurement period corresponding to the measurement period identifier arrives as a starting point.

In another aspect, there is provided a TLP, including:

an identification module, configured to identify a traffic stream according to traffic stream characteristic information, and determine whether the traffic stream is a target traffic stream;

a counting module, configured to, if yes, count a data packet of the traffic stream in a unit of a measurement period, and acquire a data packet count value corresponding to a measurement period identifier;

a determination module, configured to determine data packet measurement information including the measurement period identifier, a traffic stream identifier, the data packet count value and a TLP identifier, so that a DCP transmits the data packet measurement information to an MCP after acquiring the data packet measurement information.

Optionally, the TLP is an upstream TLP;

the identification module is specifically configured to identify the traffic stream according to the traffic stream characteristic information, and determine whether the traffic stream is a target traffic stream;

the TLP further includes:

a marking module, configured to add an identifier in the data packet of the traffic stream according to the current measurement period identifier;

the counting module is specifically configured to count the data packet with an added different identifier by using a counter corresponding to the different identifier.

In still another aspect, there is provided an MCP, including:

a reception module, configured to receive data packet transmission information transmitted by a DCP corresponding to an upstream TLP and data packet reception information transmitted by a DCP corresponding to a downstream TLP, where the data packet transmission information and the data packet reception information include a measurement period identifier, a traffic stream identifier, a data packet count value and a TLP identifier;

a determination module, configured to determine the condition of network packet loss according to the measurement period identifier, the traffic stream identifier, the data packet count value and the TLP identifier in the data packet transmission information and the measurement period identifier, the traffic stream identifier, the data packet count value and the TLP identifier in the data packet reception information.

A system for measuring network packet loss, includes a DCP, a TLP and an MCP.

The DCP is configured to acquire data packet measurement information measured by at least one TLP to a traffic stream, transmit the data packet measurement information to the MCP, so that the MCP determines the condition of network packet loss according to a measurement period identifier, a traffic stream identifier, a data packet count value and a TLP identifier.

The TLP is configured to identify the traffic stream according to traffic stream characteristic information, and determine whether the traffic stream is a target traffic stream; if yes, count a data packet of the traffic stream in a unit of a measurement period, and acquire the data packet count value corresponding to the measurement period identifier;

determine the data packet measurement information including the measurement period identifier, the traffic stream identifier, the data packet count value and the TLP identifier, so that the DCP transmits the data packet measurement information to the MCP after acquiring the data packet measurement information.

The MCP is configured to receive data packet transmission information transmitted by a DCP corresponding to an upstream TLP and data packet reception information transmitted by a DCP corresponding to a downstream TLP, where the data packet transmission information and the data packet reception information include the measurement period identifier, the traffic stream identifier, the data packet count value and the TLP identifier; determine the condition of network packet loss according to the data packet transmission information and the data packet reception information.

According to the method, the apparatus and the system for measuring network packet loss according to embodiments of the present application, the DCP acquires the data packet measurement information measured by at least one TLP to the traffic stream, uniformly transmits the data packet measurement information to the MCP, so that the MCP can determine the condition of network packet loss according to relevant information in the data packet measurement information, moreover, when multiple TLPs respectively perform measurement to the traffic stream so as to acquire respective data packet measurement information, the MCP uniformly determines the condition of packet loss of the traffic stream according to the transmitted data packet measurement information, therefore, accurate packet loss measurement can be performed on the traffic stream under the scenario of point-to-point, point-to-multipoint, or multipoint-to-multipoint networks.

BRIEF DESCRIPTION OF DRAWINGS

In order to illustrate technical solutions in embodiments of the present application or in the prior art more clearly, accompanying drawings needed for describing the embodiments or the prior art will be introduced in brief hereinafter. Apparently, the accompanying drawings show certain embodiments of the application, and persons skilled in the art can derive other drawings from them without creative efforts.

DESCRIPTION OF EMBODIMENTS

In order to make the objects, technical solutions, and advantages of embodiments of the present application clearer, the technical solutions in embodiments of the present application are hereinafter described clearly with reference to the accompanying drawings in embodiments of the present application. Obviously, the embodiments described here are part of the embodiments of the present application and not all of the embodiments. All other embodiments, which can be derived by persons skilled in the art from the embodiments given herein without creative efforts, shall fall within the protection scope of the present application.

Figure 1:
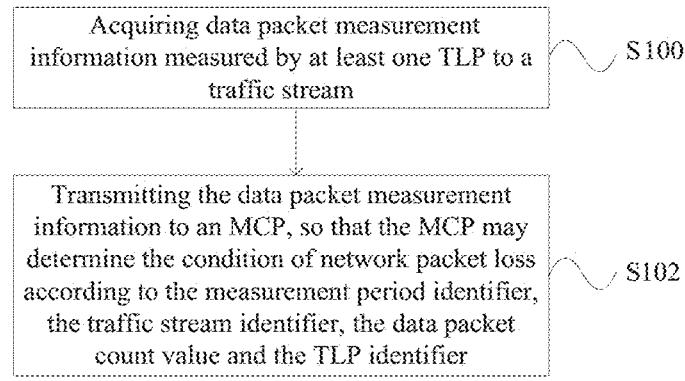
FIG. 1 is a flowchart of a method for measuring network packet loss according to Embodiment 1 of the present application.

FIG. 1 is a flow chart of a method for measuring network packet loss according to Embodiment 1 of the present application, as shown in FIG. 1, the method may include:

S100, Acquiring data packet measurement information measured by at least one target logical port (Target Logical Port, TLP) to a traffic stream.

Specifically, the data packet measurement information includes a measurement period identifier, a traffic stream identifier, a data packet count value and a TLP identifier.

When a data collecting point (Data Collecting Point, DCP) acquires the data packet measurement information measured by at least one TLP to the traffic stream, the TLP corresponds to a user side ingress of a network upstream transmitting end or a user side egress of a network downstream receiving end. The user side refers to a side of a device at the upstream transmitting end or the downstream receiving end with which a user is connected. The DCP corresponding to the upstream TLP is deployed on the same upstream transmitting end device, the DCP corresponding to the downstream TLP is deployed on the same downstream receiving end device, these DCPs are used to read data packet measurement information of the TCP on its respective device, and one TLP only corresponds to one DCP deployed on the same device, however, since the same device at the upstream transmitting end or the downstream receiving end may have multiple TLPs, one DCP can control and manage multiple TLPs on the same device.

When a traffic stream enters a network, a unique traffic stream identifier is correspondingly generated for the traffic stream, optionally, a traffic stream ID can act as the traffic stream identifier. Since one traffic stream identifier corresponds to a unique traffic stream, when the traffic stream is transmitted under a point-to-multipoint, or multipoint-to-multipoint network scenario, that is, when the traffic stream passes a forwarding device or a routing device, it starts from different upstream TLPs due to reasons such as load sharing etc., and arrives at the same or different downstream TLPs, at this time, the DCPs on the upstream transmitting end device or the downstream receiving end device acquires data packet measurement information measured by multiple TLPs to the traffic stream, and can judge whether relevant data packet count value belongs to the same traffic stream according to the traffic stream identifier.

Each data packet measurement information has its belonging TLP identifier, when acquiring data packet measurement information measured by multiple TLPs to the traffic stream, a measuring control point (Measurement Control Point, MCP) may distinguish the data packet measurement information from different TLPs according to each TLP identifier.

S102, Transmitting the data packet measurement information to the MCP, so that the MCP may determine the condition of network packet loss according to the measurement period identifier, the traffic stream identifier, the data packet count value and the TLP identifier.

Specifically, the process for acquiring and transmitting the data packet measurement information by the DCP is achieved based on a management network of a network device. The network device in the network includes a traffic port for transmitting a traffic stream and a management port. The network device in the network may constitute the management network via its own management ports. While the traffic stream is transmitted by a traffic network consisting of traffic ports of the network device, with which the transmission path of the data packet measurement information and the transmission path of the target traffic stream may be distinguished to perform out-band transmission, and guarantee independence of reading and transmitting optional data packet measurement information. The management network may adopt a three-layer measurement virtual private network (Virtual Private Network, VPN) or a public network provided with IP reachability.

Moreover, according to the method given in S102, the DCP also may jointly calculate respective data packet measurement information, after simultaneously acquiring the data packet measurement information measured by multiple TLPs to one traffic stream. The joint calculation is to jointly calculate the data packet count values in the respective data packet measurement information, and then the DCP transmits the data packet measurement information including the measurement period identifier, the traffic stream identifier, and a sum of the data packet count values to the MCP.

According to the method for measuring network packet loss of this embodiment, the DCP acquires the data packet measurement information measured by at least one TLP to the traffic stream, transmits the data packet measurement information to the MCP, so that the MCP may determine the condition of network packet loss according to relevant information in the data packet measurement information. When multiple TLPs respectively perform measurement to the traffic stream so as to acquire respective data packet measurement information, the MCP determines the condition of packet loss of the traffic stream according to multiple data packet measurement information measured by multiple TLPs to the traffic stream. Therefore, accurate packet loss measurement may be performed on the traffic stream under the scenario of point-to-point, point-to-multipoint or multipoint-to-multipoint networks.

On the basis of the method for measuring network packet loss, the DCP acquiring the data packet measurement information measured by at least one TLP to the traffic stream, includes:

a DCP for managing an upstream TLP acquires data packet transmission information measured by at least one upstream TLP to a transmitted traffic stream.

Specifically, in this embodiment, a DCP is deployed on each upstream transmitting end device, these DCPs manage the TLP on each upstream transmitting end device, and the DCP acquires data packet transmission information of the TLP on the same device with the DCP after the upstream TLP measures the transmitted traffic stream. The data packet transmission information includes: a data packet count value counted by at least one TLP on the upstream transmitting end device.

The DCP acquires the data packet reception information measured by at least one TLP to the traffic stream, which further includes:

a DCP for managing a downstream TLP acquires data packet reception information measured by at least one downstream TLP to a received traffic stream.

Specifically, similar to the above, in this embodiment, a DCP is deployed on each downstream receiving end, the DCP manages the TLP on each downstream receiving end, and the DCP acquires data packet reception information of the TLP on the same device with the DCP. The data packet reception information includes: a data packet count value counted by at least one TLP on the downstream receiving end. It should be noted that, the concept of upstream and downstream is defined relative to the transmission direction of a traffic stream in a network, for different traffic streams, a device where the same TLP locates may be an upstream transmitting end or a downstream receiving end and, therefore, the same TLP may be a upstream TLP or a downstream TLP.

Optionally, the DCP for managing the downstream TLP acquiring the data packet reception information measured by at least one downstream TLP to the received traffic stream, further includes:

the DCP for managing the downstream TLP acquires the data packet reception information, after delaying with a preset duration by taking the time when a measurement period corresponding to the measurement period identifier arrives as the starting point.

Specifically, since the network itself may have time delay and jitter during transmission process of the traffic stream, which, when the downstream receiving end receives the traffic stream data packets, causes disorder between the traffic stream data packets that are measured for packet loss based on one measurement period and transmitted to the downstream receiving end. Therefore, after delaying with a preset duration by taking the time when the measurement period corresponding to the measurement period identifier arrives as the starting point, such as a measurement period with a measurement period identifier of 1, the downstream receiving end acquires data packet reception information of an adjacent previous measurement period when the first data packet within the measurement period arrives, which guarantees that a complete data packet received at the receiving end within one measurement period can still be acquired after delaying with a preset duration, even if the data packet disorder occurs. Optionally, the preset duration is two-thirds of the measurement period. Such can effectively improve the accuracy of packet loss measurement.

According to the method for measuring network packet loss of this embodiment, since the acquired data packet measurement information includes the measurement period identifier, and each measurement period identifier is obtained in a unit of a measurement period, it is necessary to perform time synchronization with the TLP, therefore, before S100, the method further includes:

the DCP performs time synchronization with the TLP with a network time protocol (Network Time Protocol, NTP) or a 1588v2 clock.

Specifically, both the NTP and the 1588v2 clock are external synchronization tools, the NTP is a commonly-used network synchronization tool with a synchronization deviation of 1 ms to 50 ms, and can satisfy the synchronization requirement of the method for measuring network packet loss according to this embodiment. The 1588v2 clock is a high-precision clock according to the IEEE 1588V2 protocol, in terms of the network deployed with the 1588v2 clock, the method for measuring network packet loss according to this embodiment optionally adopts the 1588v2 clock to perform time synchronization.

In the method for measuring network packet loss according to this embodiment, optionally, the data packet measurement information further includes: a data packet byte statistical value for making statistics to traffic information of the traffic stream by the MCP. In this way, in addition to a packet loss performance of the traffic stream, embodiments of the present application also may provide traffic information of the traffic stream, enriching functions of performance measurement.

In the method for measuring network packet loss according to embodiments of the present application, time synchronization is performed with the TLP via an external synchronization tool first and, then the DCP for managing the upstream TLP and the DCP for managing the downstream TLP respectively acquire data packet transmission information measured by at least one upstream TLP to the transmitted traffic stream and data packet reception information measured by at least one downstream TLP to the received traffic stream. When multiple upstream and downstream TLPs respectively perform measurement to the traffic stream so as to acquire respective data packet measurement information, the MCP uniformly determines the condition of packet loss of the traffic stream according to the data packet measurement information. Therefore, accurate packet loss measurement can be performed on the traffic stream under the scenario of point-to-multipoint, point-to-multipoint or multipoint-to-multipoint networks. Moreover, the DCP for managing the downstream TLP acquires the data packet reception information after delaying with a preset duration by taking the time when the measurement period corresponding to the measurement period identifier arrives as the starting point. Unnecessary packet loss error caused by disordered data packet at the receiving end can be avoided. The data packet byte statistical value of the traffic stream can be simultaneously acquired, so as to provide functions of performance measurement in more detail.

The above embodiment describes the specific steps executed by the DCP in the method for measuring network packet loss according to the present application, hereinafter, the specific steps executed by the TLP in the method for measuring network packet loss according to the present application will be described in detail.

Figure 2:
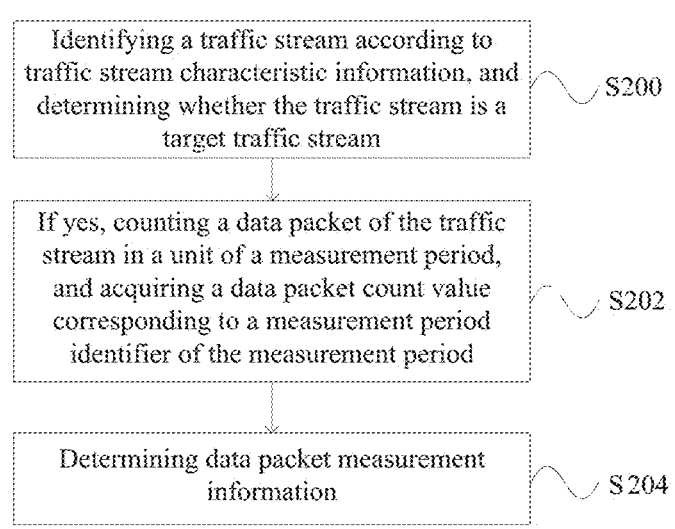
FIG. 2 is a flowchart of a method for measuring network packet loss according to Embodiment 2 of the present application.

FIG. 2 is a flow chart of a method for measuring network packet loss according to Embodiment 2 of the present application, as shown in FIG. 2, the method in this embodiment may include:

S200, Identifying a traffic stream according to traffic stream characteristic information, and determining whether the traffic stream is a target traffic stream.

Specifically, TLPs are deployed on a port of each upstream transmitting end device and a port of each downstream receiving end device, each traffic stream has its specific traffic stream characteristic information, therefore, when one traffic stream enters a network, first, the port TLP (the TLP is an upstream TLP) of the upstream transmitting end device needs to identify the traffic stream, the identification process is that, a preset traffic stream characteristic information and the traffic stream characteristic information of the traffic stream are matched and identified, if the two successfully match, the upstream TLP determines the traffic stream is a target traffic stream. When the traffic stream is transmitted under a point-to-multipoint, or multipoint-to-multipoint network scenario, whether the data packet of each upstream TLP and each downstream TLP belongs to a same traffic stream may be determined according to the traffic stream characteristic information of the traffic stream, regardless of the specific path of the traffic stream.

S202, If yes, counting the data packet of the traffic stream in a unit of a measurement period, and acquiring a data packet count value corresponding to the measurement period identifier.

Specifically, the upstream TLP counts the data packet of the traffic stream in a unit of a measurement period, and generates a corresponding measurement period identifier for each measurement period, when the traffic stream is transmitted under a point-to-multipoint, or multipoint-to-multipoint network scenario, it may be determined whether data packets belong to the data packets of a same measurement period of a traffic stream according to the measurement period identifier of the data packet.

S204, Determining data packet measurement information.

Specifically, the data packet measurement information includes a measurement period identifier, a traffic stream identifier, a data packet count value and a TLP identifier, so that the DCP can transmit the data packet measurement information to an MCP after acquiring the data packet measurement information.

According to the method for measuring network packet loss of this embodiment, identifying the traffic stream according to traffic stream characteristic information, and determining whether the traffic stream is a target traffic stream. If yes, counting the data packet of the traffic stream in a unit of a measurement period, and acquiring the data packet count value corresponding to the measurement period identifier and determining data packet measurement information. Accordingly, under a point-to-multipoint, or multipoint-to-multipoint network scenario, whether the traffic stream is a target traffic stream may be determined at first regardless of the specific path of the traffic stream, if yes, whether the data packet of each upstream TLP and each downstream TLP belong to a same target traffic stream may be further determined, then data packet measurement information, i.e., the measurement period identifier, the traffic stream identifier, the data packet count value and the TLP identifier, corresponding to different upstream TLP and downstream TLP may be determined, thereby guaranteeing accurate network packet loss measurement under the scenario of point-to-multipoint or multipoint-to-multipoint networks.

In the method for measuring network packet loss according to this embodiment, identifying the traffic stream according to traffic stream characteristic information, and determining whether the traffic stream is a target traffic stream, includes:

the upstream TLP identifies the traffic stream according to traffic stream characteristic information, and determines whether the traffic stream is a target traffic stream.

Before the counting the data packet of the traffic stream in a unit of the measurement period, the method further includes:

the upstream TLP adds an identifier in the data packet of the traffic stream according to the current measurement period identifier.

Figure 3:
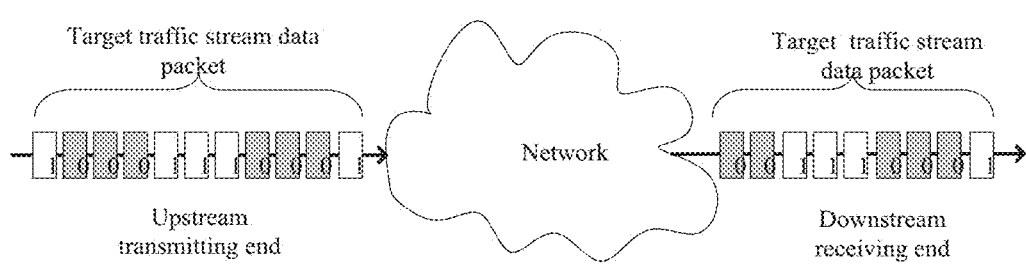
FIG. 3 is a schematic diagram of a method for adding an identifier in the method for measuring network packet loss according to Embodiment 2 of the present application.

FIG. 3 is a schematic diagram of a method for adding an identifier in the method for measuring network packet loss according to Embodiment 2 of the present application. As shown in FIG. 3, adding an identifier in a data packet of a traffic stream refers to periodically adding an identifier (setting, resetting) on a certain reserved digit in an IP header of the data packet of the traffic stream, so that the data packet of the traffic stream may be divided into different measurement intervals according to the attribute of the identifier. Each measurement interval in a unit of the measurement period has a different measurement period identifier, and then the purpose may be achieved as long as data packets within two adjacent measurement intervals are distinguished. Optionally, a method for alternately adding an identifier with an odd-numbered measurement period identifier and an even-numbered measurement period identifier is adopted. For example, with reference to FIG. 3, for a traffic stream, when the measurement period identifier is even, the TLP adds an identifier of 0 to the data packet in the measurement interval; when the measurement period identifier is odd, the TLP adds an identifier of 1 to the data packet in the measurement interval.

The same number of counters with the attributes of the identifiers are set on the upstream TLP to perform counting and statistics on intervals of the traffic stream data packets with different identifiers, and measure at spacing of intervals, for example, the data packet count value of the i-th interval of the downstream receiving end is N; corresponding counters are also set on the downstream TLP to respectively count data packets of different identifiers, a measuring point of the receiver is set according to a certain method (such as delay of reading time, etc.), so that the counter is read by the corresponding DCP after all the messages within one identifier measurement interval should arrive, for example, the data packet count value of the i-th interval of the downstream receiving end is M, because adjacent intervals have different identifiers, even if disordered data packets of other identifiers occur at the switch of adjacent intervals, they will not be counted in the counter of this identifier, but counted in the counter of its corresponding identifier, and thus correctness and integrity of counting can be guaranteed. For example, The DCP transmits the information carrying N and M to the MCP, synchronous identification is performed according to a certain method, and packet loss statistics within the period may be obtained by comparing the number of transmission and reception within the same interval, for a measurement interval i, the packet loss number=N−M.

The counting the data packet of the traffic stream in a unit of the measurement period, includes:

the upstream TLP counts the data packets with added different identifiers with counters corresponding to the different identifiers.

Specifically, because data packets within measurement periods of different identifiers have different identifiers, then the upstream TLP counts the data packets of different identifiers with counters corresponding to the different identifiers, for example, after a target traffic stream enters the upstream TLP, adding a data packet identifier of 0 in a measurement period, adding a data packet identifier of 1 in an adjacent measurement period, then the upstream TLP sets a counter 0, a counter 1, and transmits the data packet with the identifier of 0 in a unit of a measurement period to the corresponding counter 0 to count the data packet, and transmits the data packet with the identifier of 1 in a unit of a measurement period to the corresponding counter 1 to count the data packet.

The adding the identifier in the data packet of the traffic stream, may include:

adding the identifier on a reserved digit of type of service (Type of Service, TOS) or a reserved digit of Flags in an IP header of the data packet.

Specifically, the range designated for the identifier is six digits in two domains of TOS and Flags in the data packet IP header, the third to seventh digits of TOS, and the null digit of flags. Specifically, in different specific networks, the last few digits (the third to seventh digits) of the TOS are often not used, especially the sixth and seventh digits are seldom used, and therefore, the few digits of IP header may be borrowed for adding the identifier. In the IP header of the IPv4, the null digit of Flags is a current unique reserved digit in the IP header, and in a common IP header, the digit can be used for adding the identifier to the data packet.

In the method for measuring network packet loss according to this embodiment, the identifying the traffic stream according to traffic stream characteristic information, and determining whether the traffic stream is a target traffic stream, includes:

a downstream TLP identifies the traffic stream according to traffic stream characteristic information, and determines whether the traffic stream is a target traffic stream.

When the traffic stream arrives the downstream receiving end via the network, the downstream TLP also needs to identify the traffic stream according to traffic stream characteristic information, and determine whether the traffic stream is a target traffic stream. Such a process is similar to the identification process of the upstream TLP, and is not repeated here any further.

In the method for measuring network packet loss according to this embodiment, optionally, the identifying the traffic stream according to traffic stream characteristic information, includes:

identifying the traffic stream according to at least two-tuple information in a five-tuple group.

Specifically, the five-tuple group refers to a source IP address, a destination IP address, an IP address prefix, a source protocol port number, and a destination protocol port number in an IP header. Optionally, a TOS field information in the IP header, in addition to the five-tuple group, also may be added to designate the traffic stream characteristic information, all the above fields may be designated, so that the measured traffic stream may be very fine; the fields also may be partially designated, for example, at least two tuples in the five-tuples group, i.e., the source IP address and the destination IP address may be designated; or the source IP address, the destination IP address, and the IP address prefix may be designated; or the source IP address, the destination IP address, the IP address prefix and the TOS information may be designated. The TLP may define the traffic stream characteristic information in two manners, one is to configure intensively by the MCP and intensively define each TLP by the DCP; the second is to define by each TLP itself.

In terms of the method for measuring network packet loss according to this embodiment, since the measurement period identifier is determined, the data packet identifier is added, the counting is performed upon data packet identifier and the data packet measurement information is finally determined all based on a unit of a measurement period, and it may be seen from Embodiment 1 that the data packet measurement information in each measurement period will be read, and transmitted to the MCP for determining the condition of packet loss, before identifying the traffic stream according to the traffic stream characteristic information, the method further includes:

the upstream and downstream TLPs perform time synchronization with the DCP with a NTP or a 1588v2 clock.

The method for measuring network packet loss according to this embodiment may further include:

making statistics to data packet byte information of the traffic stream, so that the DCP may transmit data packet byte statistical information to the MCP after acquiring the data packet byte statistical information.

In the method for measuring network packet loss according to the embodiments of the present application, first time synchronization is performed with corresponding DCP via the external synchronization tool, guaranteeing that each upstream TLP and each downstream TLP can perform corresponding packet loss operations by a unified time reference. The upstream TLP identifies the traffic stream according to traffic stream characteristic information, which is defined according to the five-tuple group and the TOS field information included in the IP header of the data packet, and determines whether the traffic stream is a target traffic stream. If yes, the upstream TLP adds an identifier in the data packet of the traffic stream in a unit of a measurement period according to the current measurement period identifier before counting, and sets the identifier on a reserved digit of TOS or a reserved digit of Flags in the IP header of the data packet to distinguish the data packets in adjacent measurement periods. Then, the upstream TLP counts the data packets with added different identifiers with the counters corresponding to the different identifiers. When the traffic stream arrives the downstream receiving end, the downstream TLP identifies the traffic stream according to traffic stream characteristic information, and determines whether the traffic stream is a target traffic stream. If yes, the downstream TLP performs the counting operation similar to that of the upstream TLP. Each TLP on the upstream transmitting end device and the downstream receiving end device identifies the traffic stream, so that the traffic stream may be identified and corresponding packet loss measurement operations may be performed under the scenario of point-to-point, point-to-multipoint or multipoint-to-multipoint networks. The method for measuring network packet loss according to the embodiments of the present application may achieve the network packet loss measurement under the scenario of point-to-multipoint or multipoint-to-multipoint networks. Moreover, optionally, statistics is made to data packet byte information of the traffic stream, the implementation principle and technical effect of making statistics to the data packet byte information are similar to those in Embodiment 1, and are not repeated here any further.

Hereinafter, the steps executed by the MCP in the method for measuring network packet loss according to the present application will be described in detail.

Figure 4:
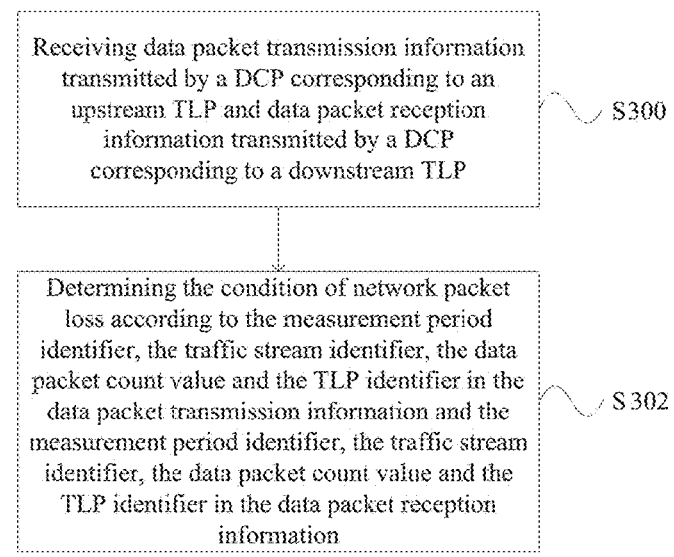
FIG. 4 is a flowchart of a method for measuring network packet loss according to Embodiment 3 of the present application.

FIG. 4 is a flow chart of a method for measuring network packet loss according to Embodiment 3 of the present application, as shown in FIG. 4, the method in this embodiment may include:

S300, Receiving data packet transmission information transmitted by a DCP corresponding to an upstream TLP and data packet reception information transmitted by a DCP corresponding to a downstream TLP.

Specifically, the data packet transmission information transmitted by the DCP corresponding to the upstream TLP and data packet reception information transmitted by the DCP corresponding to the downstream TLP are received by an MCP. Moreover, the data packet transmission information and the data packet reception information include a measurement period identifier, a traffic stream identifier, a data packet count value and a TLP identifier respectively.

S302, Determining the condition of network packet loss according to the measurement period identifier, the traffic stream identifier, the data packet count value and the TLP identifier in the data packet transmission information and the measurement period identifier, the traffic stream identifier, the data packet count value and the TLP identifier in the data packet reception information.

Specifically, the data packet transmission information transmitted by the DCP corresponding to the upstream TLP and data packet reception information transmitted by the DCP corresponding to the downstream TLP are received by the MCP. Moreover, according to the method for measuring network packet loss according to the embodiments of the present application, the MCP may be deployed on any network element node throughout the network, optionally, the MCP is deployed on a network element node with a stronger function, and the MCP connects with the DCP based on the management network.

In the method for measuring network packet loss according to the embodiments of the present application, the MCP receives the data packet measurement information transmitted by each DCP corresponding to the upstream TLP and the downstream TLP, the data packet measurement information is divided into the data packet transmission information and the data packet reception information; then the MCP determines the condition of network packet loss according to the data packet transmission information of the upstream TLP and the data packet reception information of the downstream TLP; since each data packet measurement information includes the measurement period identifier, the traffic stream identifier, the data packet count value and the TLP identifier, the data packet measurement information corresponding to multiple TLPs may be effectively distinguish, and network packet loss measurement under the scenario of point-to-multipoint or multipoint-to-multipoint networks may be achieved.

Optionally, the determining the condition of network packet loss according to the measurement period identifier, the traffic stream identifier, the data packet count value and the TLP identifier in the data packet transmission information and the measurement period identifier, the traffic stream identifier, the data packet count value and the TLP identifier in the data packet reception information, includes:

determining whether packet loss occurs in the traffic stream corresponding to the traffic stream identifier and the TLP identifier within the measurement period corresponding to the measurement period identifier, according to the data packet count value in the data packet transmission information and the data packet count value in the data packet reception information.

Specifically, when the packet loss measurement is performed to the target traffic stream, optionally, a target traffic stream measurement data summary table is maintained in the MCP. Table 1 is a target traffic stream measurement data summary table according to this embodiment, and how to determine the condition of network packet loss in this embodiment will be described hereinafter with reference to Table 1.

TABLE 1

Target Traffic Stream Measurement Data Summary Table

| Measurement Period Identifier | Traffic Stream Identifier | Data Type | Left TLPs (n) | | Right TLPs (m) | | Data Present Flag |
|---|---|---|---|---|---|---|---|
| | | | TLP (1) | ... TLP (n) | TLP (1) | ... TLP (m) | |
| N | Forward Traffic Stream Identifier | Packet Count Value | Data Packet Count Value of Transmitting End | ... Data Packet Count Value of Transmitting End | Data Packet Count Value of Receiving End | ... Not present | N |
| | | Byte Count Value | Data Packet Byte Count Value of Transmitting End | ... Data Packet Byte Count Value of Transmitting End | Data Packet Byte Count Value of Receiving End | ... Data Packet Byte Count Value of Receiving End | |
| | Reverse Traffic Stream Identifier | Packet Count Value | Data Packet Count Value of Receiving End | ... Data Packet Count Value of Receiving End | Data Packet Count Value of Transmitting End | ... Data Packet Count Value of Transmitting End | Y |
| | | Byte Count Value | Data Packet Byte Count Value of Receiving End | ... Data Packet Byte Count Value of Receiving End | Data Packet Byte Count Value of Transmitting End | ... Data Packet Byte Count Value of Transmitting End | |
| N-1 | Forward Traffic Stream Identifier | Packet Count Value | Data Packet Count Value of Transmitting End | ... Data Packet Count Value of Transmitting End | Data Packet Count Value of Receiving End | ... Data Packet Byte Count Value of Receiving End | Y |
| | | Byte Count Value | Data Packet Byte Count Value of Transmitting End | ... Data Packet Byte Count Value of Transmitting End | Data Packet Byte Count Value of Receiving End | ... Data Packet Byte Count Value of Receiving End | |
| | Reverse Traffic Stream Identifier | Packet Count Value | Data Packet Count Value of Receiving End | ... Data Packet Count Value of Receiving End | Data Packet Count Value of Transmitting End | ... Data Packet Count Value of Transmitting End | Y |
| | | Byte Count Value | Data Packet Byte Count Value of Receiving End | ... Data Packet Byte Count Value of Receiving End | Data Packet Byte Count Value of Transmitting End | ... Data Packet Byte Count Value of Transmitting End | |
| ... | ... | ... | ... | ... ... | ... | ... ... | ... |

In terms of Table 1, the target traffic stream measurement data summary table, it should be noted that, the concepts of left TLPs and right TLPs in the table are defined by a network, after one side of the network is defined to be left, the TLPs deployed on the left ports are left TLPs, and the right TLPs are defined correspondingly. In the process for measuring network packet loss according to the embodiments of the present application, two target traffic streams in two opposite directions may be present at the same time, the MCP may define one of the target traffic streams as a forward traffic stream, according to a source IP address and a destination IP address in the five-tuple group of the two target traffic streams, and in turn define the other target traffic stream as a reverse traffic stream. For example, the range of the network includes all the devices and networks from the left port device to the right port device. It is assumed that target traffic stream A enters the network from each TLP on the left port device, and leaves the network from each TLP on the right port device; target traffic stream B enters the network from each TLP on the right port device, and leaves the network from each TLP on the left port device. In terms of target traffic stream A, the left port device is the upstream transmitting end device, and the left TLP is the upstream transmitting end; in terms of target traffic stream B, the left port device is the downstream receiving end device, and the left TLP is the downstream receiving end. When the packet loss measurement is performed to target traffic streams in two different directions based on one TLP, on Table 1, the target traffic stream measurement data summary table of the MCP, the MCP maintains a forward traffic stream data entry and a reverse traffic stream data entry in each period, so as to achieve the function of simultaneously performing packet loss measurement to two opposite traffic streams.

The DCP reads the data packet measurement information of multiple TLPs in a unit of a measurement period and transmits to the MCP, the MCP first finds corresponding target traffic stream measurement data summary table according to the traffic stream identifier, optionally, taking a target traffic stream ID as the traffic stream identifier, and then fills the data in corresponding data entry of the measurement data summary table according to the traffic stream identifier, the measurement period identifier, and the TLP identifier. Or optionally, the DCP for managing the upstream TLP jointly calculates the data packet measurement information of multiple upstream TLPs and then transmits to the MCP, and the MCP only needs to perform corresponding packet loss measurement and calculation according to the sum of data packet measurement information of left TLPs and the sum of data packet measurement information of right TLPs.

Data packet count values and data packet byte count values of all the TLPs in each measurement period will correspond to one data present flag in the target traffic stream measurement data summary table, when data packet count values and data packet byte count values of all the TLPs in one measurement period corresponding to each measurement period identifier are not present, the MCP sets the data present flag of the measurement period to be "N", for example, in Table 1, in the data entry corresponding to the forward traffic stream with the measurement period identifier of N, the data packet count value of the m-th TLP in the right TLPs is not present, the MCP sets the corresponding data present flag to be "N", after the MCP receives the packet count value of this TLP transmitted by the DCP, the MCP sets the corresponding data present flag to be "Y".

After the MCP detects the data present flag of one measurement period data entry is set to be "Y", then the MCP calculates a packet loss number and a packet loss ratio with the data packet count value measured by each TLP of the transmitting end within the measurement period and the data packet count value measured by each TLP of the receiving end within the measurement period, of which a formula is as follows:

the packet loss number in the measurement period=the data packet count value of the transmitting end in the measurement period−the data packet count value of the receiving end in the measurement period;

the packet loss ratio in the measurement period=(the data packet count value of the transmitting end in the measurement period−the data packet count value of the receiving end in the measurement period)/the data packet count value of the transmitting end in the measurement period.

Seen from Table 1, operations of the MCP herein are always directed to a one-way target traffic stream.

In the above method for determining the condition of network packet loss, since the measurement data packet carrying the data packet measurement information may lose during the transmission process of the data packet measurement information among TLPs, DCPs and MCP throughout the network, in order to avoid a reduction of the accuracy of packet loss measurement caused by measurement data packet loss, the determining the condition of network packet loss optionally includes:

determining whether packet loss occurs in the traffic stream corresponding to the traffic stream identifier and the TLP identifier within the measurement period corresponding to the measurement period identifier, according to the data packet count value in the data packet transmission information, the data packet count value in the data packet reception information, the data packet count value in the data packet transmission information of the previous measurement period, and the data packet count value in the data packet reception information of the previous measurement period.

Specifically, it is assumed that the measurement period identifier of a measurement period is N, then the MCP finds a closest data entry N−i before N with a formula as follows:

The packet loss number (N)=(a sum of data packet count values of the transmitting end with measurement period identifiers 0 to N−a sum of data packet count values of the transmitting end with measurement period identifiers 0 to N−i)−(a sum of data packet count values of the receiving end with measurement period identifiers 0 to N−a sum of data packet count values of the receiving end with measurement period identifiers 0 to N−i).

The packet loss ratio (N)=the packet loss number (N)/(a sum of data packet count values of the transmitting end with measurement period identifiers 0 to N−a sum of data packet count values of the transmitting end with measurement period identifiers 0 to N−i).

In the method for measuring network packet loss according to the embodiments of the present application, the MCP receives the data packet measurement information transmitted by each DCP corresponding to the upstream TLP and the downstream TLP, the data packet measurement information is divided into the data packet transmission information and the data packet reception information, the MCP records and maintains the data packet transmission information of the TLP on the upstream transmitting end and the data packet reception information of the TLP on the downstream receiving end in the target traffic stream measurement data summary table, then performs the above calculation with the data packet count value of the transmitting end and the data packet count value of the receiving end in a unit of a measurement period according to the target traffic stream measurement data summary table, so as to determine the condition of network packet loss and improve accuracy of network packet loss in this embodiment based on the preferable solution for determining network packet loss given above.

Figure 5:
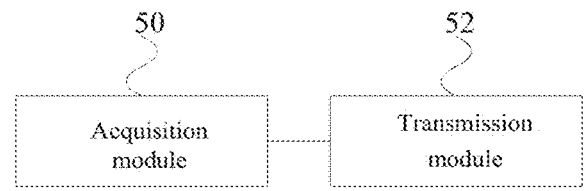
FIG. 5 is a schematic structural diagram of a DCP according to Embodiment 1 of the present application.

FIG. 5 is a schematic structural diagram of a DCP according to Embodiment 1 of the present application, as shown in FIG. 5, the DCP includes: an acquisition module 50 and a transmission module 52.

The acquisition module 50 is configured to acquire data packet measurement information measured by at least one TLP to a traffic stream, where the data packet measurement information includes a measurement period identifier, a traffic stream identifier, a data packet count value and a TLP identifier;

The transmission module 52 is configured to transmit the data packet measurement information to an MCP, so that the MCP may determine the condition of network packet loss according to the measurement period identifier, the traffic stream identifier, the data packet count value and the TLP identifier.

Specifically, both the acquisition module 50 and the transmission module 52 perform corresponding acquiring and transmitting operations in a unit of the measurement period. Moreover, both the acquisition module 50 and the transmission module 52 are based on the method for measuring network packet loss according to Embodiment 1 of the present application, that is, the out-band transmission manner mentioned in S102, to acquire the data packet measurement information of corresponding TLP and transmit the data packet measurement information to the MCP, and the specific meaning of the out-band transmission has been described in details in S102, and is not repeated here any further.

The DCP in this embodiment may be used to implement the technical solutions of the method embodiment shown in FIG. 1, the implementation principle and technical effect are similar thereto, and are not repeated here any further.

For the DCP according to this embodiment, in terms of the DCP for managing an upstream TLP, the acquisition module 50 is specifically configured to acquire data packet transmission information measured by at least one upstream TLP to the transmitted traffic stream.

Or, in the DCP for managing a downstream TLP, the acquisition module 50 is specifically configured to acquire data packet reception information measured by at least one downstream TLP to the received traffic stream.

Optionally, in the DCP for managing the downstream TLP, the acquisition module 50 is specifically configured to acquire the data packet reception information, after delaying with a preset duration by taking the time when the measurement period corresponding to the measurement period identifier arrives as the starting point. Optionally, the preset duration is two-thirds of the measurement period. For example, it is assumed that the measurement period is T, at time N, the last data packet in a set of data packets arrives at the downstream receiving end, the set of data packets are received and measure by its downstream TLP to obtain data packet reception information, since the TLP on the upstream transmitting end adds identifiers of 0 and 1 in a unit of a measurement period to the data packet of the target traffic stream to distinguish data packets in adjacent measurement periods, in consideration of synchronization of different TLPs and DCPs in the entire network, it needs to be ensured that all the acquisition modules 50 of the DCPs acquire the data packet reception information of the TLP on the downstream receiving end after the time N when the last data packet in one measurement period T arrives at the receiving end, and before the time M when the first data packet of the next set of data packets with the same identifiers arrives, and thus the DCP can read accurately and completely. Therefore, if reading after delaying with a preset duration by taking the time N as a reference, the above condition can be satisfied, optionally, requirements in most networks can be satisfied if the reading module of the DCP reads at N+2/3T.

Figure 6:
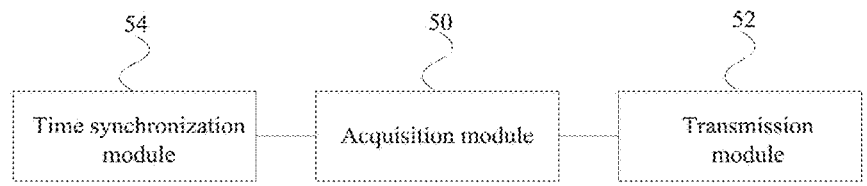
FIG. 6 is a schematic structural diagram of a DCP according to Embodiment 2 of the present application.

FIG. 6 is a schematic structural diagram of a DCP according to Embodiment 2 of the present application, as shown in FIG. 6, the apparatus for measuring network packet loss DCP according to this embodiment further includes a time synchronization module 54 on the basis of the apparatus for measuring network packet loss DCP according to FIG. 5.

The time synchronization module 54 is configured to perform time synchronization with the TLP with a NTP or a 1588v2 clock, before the acquisition module acquires the data packet measurement information measured by at least one TLP to the traffic stream.

In terms of the apparatus for measuring network packet loss DCP according to this embodiment, optionally, the acquisition module 60 is further configured to acquire a data packet byte statistical value for making statistics to traffic information of the traffic stream by the MCP.

The DCPs according to Embodiment 1 and Embodiment 2 of the present application are respectively deployed on the upstream transmitting end device and the downstream receiving end device, for reading the data packet measurement information of TLPs on respective devices.

In the DCP according to Embodiment 2, the time synchronization module first performs time synchronization with the TLP, and the DCP for managing the upstream TLP and the DCP for managing the downstream TLP respectively acquire, via respective acquisition module, data packet transmission information measured by at least one upstream TLP to the transmitted traffic stream and data packet reception information measured by at least one downstream TLP to the received traffic stream. The transmission module transmits corresponding data packet measurement information. When multiple upstream and downstream TLPs respectively perform measurement to the traffic stream so as to acquire respective data packet measurement information, the MCP uniformly determines the condition of packet loss of the traffic stream according to the data packet measurement information. Therefore, accurate packet loss measurement may be performed on the traffic stream under the scenario of point-to-point, point-to-multipoint or multipoint-to-multipoint networks. Moreover, the acquisition module of the DCP for managing the downstream TLP acquires the data packet reception information after delaying with a preset duration by taking the time when the measurement period corresponding to the measurement period identifier arrives as the starting point. Unnecessary packet loss error caused by disordered data packets at the receiving end can be avoided. The data packet byte statistical value of the traffic stream can be simultaneously acquired, so as to provide functions of performance measurement in more detail.

Figure 7:
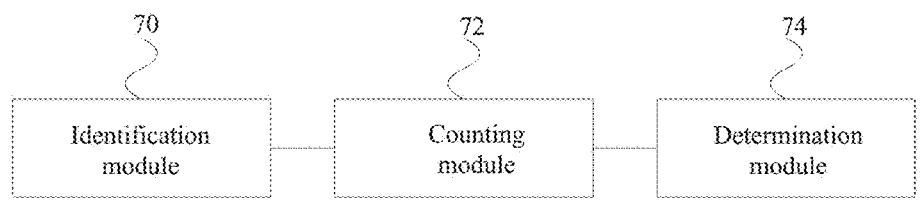
FIG. 7 is a schematic structural diagram of a TLP according to Embodiment 1 of the present application.

FIG. 7 is a schematic structural diagram of a TLP according to Embodiment 1 of the present application, as shown in FIG. 7, the TLP structure includes: an identification module 70, a counting module 72 and a determination module 74.

The identification module 70 is configured to identify a traffic stream according to traffic stream characteristic information, and determine whether the traffic stream is a target traffic stream;

If yes, the counting module 72 is configured to count a data packet of the traffic stream in a unit of a measurement period, and acquire a data packet count value corresponding to a measurement period identifier;

The determination module 74 is configured to determine data packet measurement information including the measurement period identifier, a traffic stream identifier, the data packet count value and a TLP identifier, so that the DCP can transmit the data packet measurement information to an MCP after acquiring the data packet measurement information.

The TLP in this embodiment may be used to implement the technical solutions of the method embodiment shown in FIG. 2, the implementation principle and technical effect are similar thereto, and are not repeated here any further.

Figure 8:
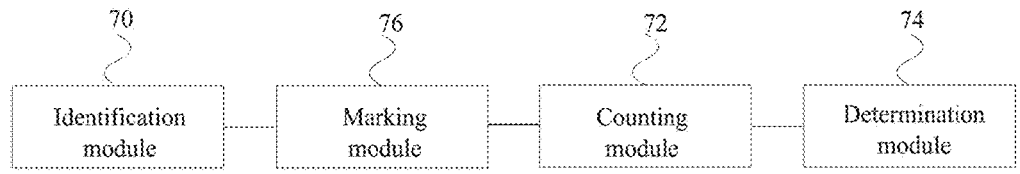
FIG. 8 is a schematic structural diagram of a TLP according to Embodiment 2 of the present application.

FIG. 8 is a schematic structural diagram of a TLP according to Embodiment 2 of the present application, on the basis of the TLP in FIG. 7, the TLP is an upstream TLP.

The identification module 70 is specifically configured to identify the traffic stream according to traffic stream characteristic information, and determine whether the traffic stream is a target traffic stream. The TLP further includes:

a marking module 76, configured to add an identifier in the data packet of the traffic stream according to the current measurement period identifier. Specifically, the method for adding the identifier has been described in detail in the method for measuring network packet loss according to Embodiment 2 of the present application, and is not repeated here any further. It should be noted that, the concepts of upstream and downstream can be converted depending on different directions of the target traffic stream for the same TLP. Therefore, the TLP determines the direction of the target traffic stream according to the five-tuple group in the IP header of the target traffic stream data packet, optionally, the source IP address and the destination IP address in the five-tuple group, and thus determines that the TLP is an upstream TLP or a downstream TLP, when the TLP is determined to be the upstream TLP, the TLP initiates its marking module 76.

The counting module 72 is specifically configured to count the data packet with an added different identifier with a counter corresponding to the different identifier.

The identification module 76 of the upstream TLP is specifically configured to add the identifier on a reserved digit of TOS or a reserved digit of Flags in an IP header of the data packet. Particularly, the range designated for the identifier has been described in detail in the method for measuring network packet loss according to Embodiment 2 of the present application, and is not repeated here any further.

When the apparatus for measuring network packet loss TLP according to this embodiment is the downstream TLP, in particular, the identification module 70, the counting module 72 and the determination module 74 of the downstream TLP have the same functions with those of the upstream TLP, since it is not necessary for the downstream TLP to add the identifier to the data packet, the marking module 76 is not initiated. Particularly, the identification module 70 is specifically configured to identify the traffic stream according to at least two-tuple information in the five-tuple group. Particularly, the five-tuple group has been described in detail in the method for measuring network packet loss according to Embodiment 2 of the present application, and is not repeated here any further.

Figure 9:
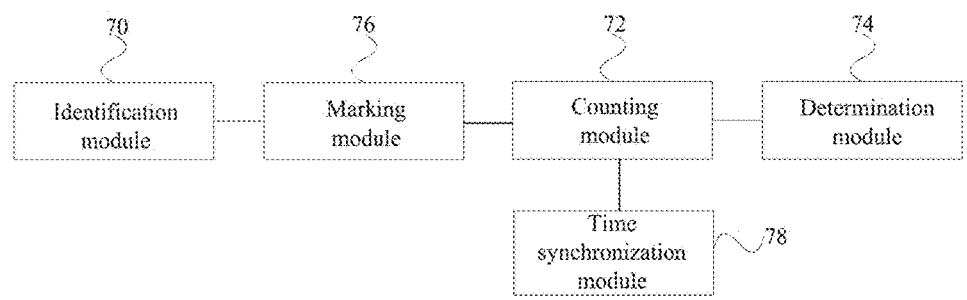
FIG. 9 is a schematic structural diagram of a TLP according to Embodiment 3 of the present application.

FIG. 9 is a schematic structural diagram of a TLP according to Embodiment 3 of the present application, as shown in FIG. 9, the apparatus for measuring network packet loss TLP according to this embodiment further includes a time synchronization module 78 on the basis of the apparatus for measuring network packet loss TLP according to FIG. 8.

The time synchronization module 78 is configured to perform time synchronization with the DCP with a NTP or a 1588v2 clock.

Specifically, since the apparatus for measuring network packet loss TLP according to this embodiment adopts the time synchronization module 78, time synchronization of the upstream TLP and the downstream TLP can be achieved, when the upstream TLPs count the packet loss in a unit of a measurement period, one corresponding measurement period identifier is generated for each measurement period by the formula as follows:

Period identifier=overall seconds/measurement period duration.

For example, the time when the upstream TLP is enabled to perform packet loss measurement for the target traffic stream is defined by the time synchronization module to be 0, each measurement period duration is 1 s, and the time when the upstream TLP starts to add an identifier to the first data packet within a measurement period is 10 s by taking the time 0 as the reference, then the measurement period identifier of the measurement period is 10 s/1 s=10 by the formula as above.

It should be noted that, the upstream TLP and the downstream TLP count the data packet of one traffic stream at the same starting point because the time synchronization is achieved, data packets in each measurement period have consistent overall seconds for the upstream TLP and the downstream TLP, according to the formula, the measurement period identifiers obtained by calculation of the upstream and the downstream are also consistent.

Figure 10:
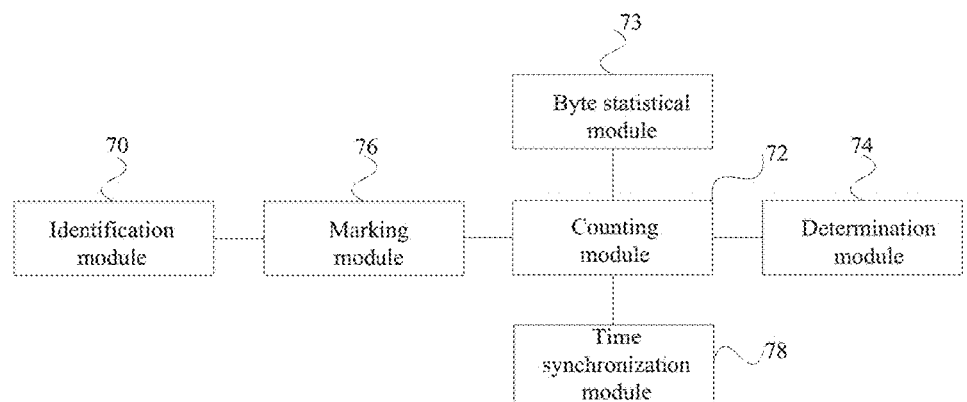
FIG. 10 is a schematic structural diagram of a TLP according to Embodiment 4 of the present application.

FIG. 10 is a schematic structural diagram of a TLP according to Embodiment 4 of the present application, as shown in FIG. 10, the apparatus for measuring network packet loss TLP according to this embodiment further includes a byte statistics module 73.

The byte statistics module 73 is configured to make statistics to data packet byte information of the traffic stream, so that the DCP can transmit data packet byte statistical information to the MCP after acquiring the data packet byte statistical information.

The TLPs according to Embodiment 1, Embodiment 2, Embodiment 3 and Embodiment 4 of the present application are deployed at the user side of the upstream transmitting end device and the downstream receiving end device in the network, when the methods for measuring network packet loss according to Embodiment 1, Embodiment 2, Embodiment 3 and Embodiment 4 of the present application are performed, the condition of packet loss determined according to the data packet measurement information measured by the TLP also includes the condition of packet loss of the upstream transmitting end device and the downstream receiving end device, so that the methods for measuring network packet loss according to Embodiment 1, Embodiment 2 and Embodiment 3 are more accurate, one TLP only corresponds to the DCP deployed on the same device, however, the same upstream transmitting end device or downstream receiving end device may have multiple TLPs, so one DCP can control and manage multiple TLPs on the same device.

In TLP according to Embodiment 3 and TLP according to Embodiment 4 of the present application, the time synchronization module first performs time synchronization with corresponding DCP, guaranteeing that each upstream TLP and each downstream TLP can perform corresponding packet loss measurement by a unified time reference. The upstream TLP identifies the traffic stream via the identification module according to traffic stream characteristic information, which is defined according to the five-tuple group and the TOS information included in the IP header of the data packet, and determines whether the traffic stream is a target traffic stream. If yes, the marking module of the upstream TLP adds an identifier in the data packet of the traffic stream in a unit of a measurement period according to the current measurement period identifier before counting. Then, the counting module of the upstream TLP counts the data packets with added different identifiers with counters corresponding to the different identifiers. When the traffic stream arrives the downstream receiving end, the identification module of the downstream TLP identifies the traffic stream according to traffic stream characteristic information, and determines whether the traffic stream is the target traffic stream. If yes, the counting module of the downstream TLP performs the counting operation similar to that of the upstream TLP. Each TLP on the upstream transmitting end device and the downstream receiving end device identifies the traffic stream, and respective determination module of the upstream TLP and the downstream TLP determines corresponding data packet measurement information. Thus, the traffic stream can be identified and corresponding packet loss measurement operations can be performed under the scenario of point-to-point, point-to-multipoint or multipoint-to-multipoint networks. The TLP according to the embodiments of the present application can achieve the network packet loss measurement under the scenario of point-to-multipoint or multipoint-to-multipoint networks. Moreover, optionally, the byte statistics module makes statistics to data packet byte information of the traffic stream, the implementation principle and technical effect of making statistics to the data packet byte information are similar to those in Embodiment 1, and are not repeated here any further.

Figure 11:
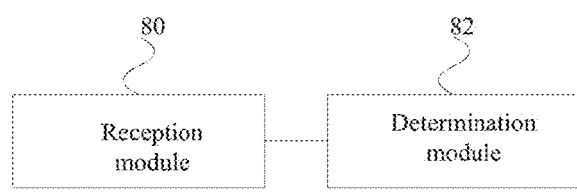
FIG. 11 is a schematic structural diagram of an MCP according to Embodiment 1 of the present application.

FIG. 11 is a schematic structural diagram of an MCP according to Embodiment 1 of the present application, as shown in FIG. 11, the MCP structure includes: a reception module 80 and a determination module 82.

The reception module 80 is configured to receive data packet transmission information transmitted by a DCP corresponding to an upstream TLP and data packet reception information transmitted by a DCP corresponding to a downstream TLP, where the data packet transmission information and the data packet reception information include a measurement period identifier, a traffic stream identifier, a data packet count value and a TLP identifier.

After one target traffic stream enables and initiates the packet loss measurement, the MCP needs to maintain a target traffic stream measurement data summary table, and the specific principle and function have been described in details in the method for measuring network packet loss according to Embodiment 3 of the present application, and are not repeated here any further.

The determination module 82 is configured to determine the condition of network packet loss according to the measurement period identifier, the traffic stream identifier, the data packet count value and the TLP identifier in the data packet transmission information and the measurement period identifier, the traffic stream identifier, the data packet count value and the TLP identifier in the data packet reception information, and the specific principle and implementation have been described in details in the method for measuring network packet loss according to Embodiment 3 of the present application, and are not repeated here any further.

The MCP according to embodiments of the present application can be used to implement the technical solutions of the method embodiment shown in FIG. 4, the implementation principle and technical effect are similar thereto, and are not repeated here any further.

In terms of the MCP, the determination module 82 is specifically configured to determine whether packet loss occurs in the traffic stream corresponding to the traffic stream identifier and the TLP identifier within the measurement period corresponding to the measurement period identifier, according to the data packet count value in the data packet transmission information and the data packet count value in the data packet reception information.

Specifically, in the method for measuring network packet loss according to Embodiment 3 of the present application, the MCP maintains the measurement data summary table, when the determination module 82 switches a present flag of one period to "Y", then the determination module 82 calculates a packet loss number and a packet loss ratio with the data packet count value measured by each upstream TLP within the measurement period and the data packet count value measured by each downstream TLP within the measurement period, the specific calculating method and the formula have been described in detail in the method for measuring network packet loss according to Embodiment 3 of the present application, and are not repeated here any further.

Since the measurement data packet carrying the data packet measurement information may lose during the transmission process of the data packet transmission information among TLP, DCP and MCP throughout the network, in order not to affect the accuracy of packet loss measurement caused by measurement data packet loss, optionally, the determination module 82 is specifically configured to determine whether packet loss occurs in the traffic stream corresponding to the traffic stream identifier and the TLP identifier within the measurement period corresponding to the measurement period identifier, according to the data packet count value in the data packet transmission information, the data packet count value in the data packet reception information, the data packet count value in the data packet transmission information of the previous measurement period, and the data packet count value in the data packet reception information of the previous measurement period.

The specific preferable solution, the calculating method and the formula have been described in detail in the method for measuring network packet loss according to Embodiment 3 of the present application, and are not repeated here any further.

Figure 12:
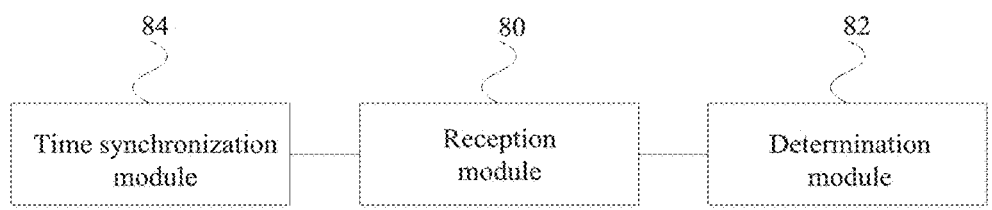
FIG. 12 is a schematic structural diagram of an MCP according to Embodiment 2 of the present application.

FIG. 12 is a schematic structural diagram of an MCP according to Embodiment 2 of the present application, in terms of the apparatus for measuring network packet loss MCP according to the embodiments of the present application, since in the measurement data summary table maintained by the MCP, the data packet count value (optionally, the data packet byte count value) of each period needs to be filled in corresponding measurement data summary table data entry according to the measurement period identifier, as shown in FIG. 12, the MCP also includes: a time synchronization module 84.

The time synchronization module 84 is configured to perform time synchronization with the DCP with a NTP or a 1588v2 clock. The measurement period identifier of each measurement period is calculated according to the calculating formula given in Embodiment 2 of the present application.

The MCP according to the embodiments of the present application can be deployed on any node device in the network, optionally, the MCP is deployed on a node device with a stronger capability.

The MCP in this embodiment can be used to implement the technical solutions of the method embodiment shown in FIG. 4, the implementation principle and technical effect are similar thereto, and are not repeated here any further.

Figure 13:
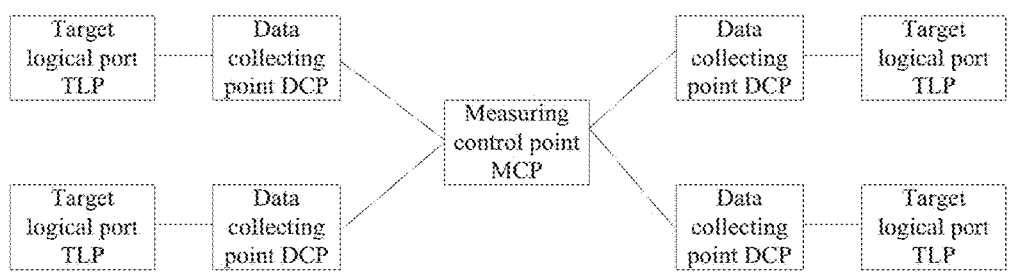
FIG. 13 is a schematic structural diagram of a system for measuring network packet loss according to Embodiment 1 of the present application.

FIG. 13 is a schematic structural diagram of a system for measuring network packet loss according to Embodiment 1 of the present application, as shown in FIG. 13, the system in this embodiment includes: a DCP, a TLP and an MCP; only two TLPs and corresponding DCPs are deployed on each side of the network in FIG. 13, on both sides of the network, multiple TLPs on a device can correspond to one DCP deployed on this device, and embodiments of the present application are not limited the numbers of the TLPs and corresponding DCPs. The DCP can adopt structures in FIG. 5 and FIG. 6, and correspondingly can implement technical solutions in the method for measuring network packet loss according to Embodiment 1 of the present application; the TLP can adopt structures in FIG. 7 to FIG. 10, and correspondingly can implement technical solutions in the method for measuring network packet loss according to Embodiment 2; the MCP can adopt structures in FIG. 11 and FIG. 12, and correspondingly can implement technical solutions in the method for measuring network packet loss according to Embodiment 3, the implementation principle and technical effect are similar, and are not repeated here any further.

Hereinafter, overall description to the method, apparatus and system for measuring network packet loss according to the present application will be made with reference to FIG. 14 to FIG. 16.

Figure 14:
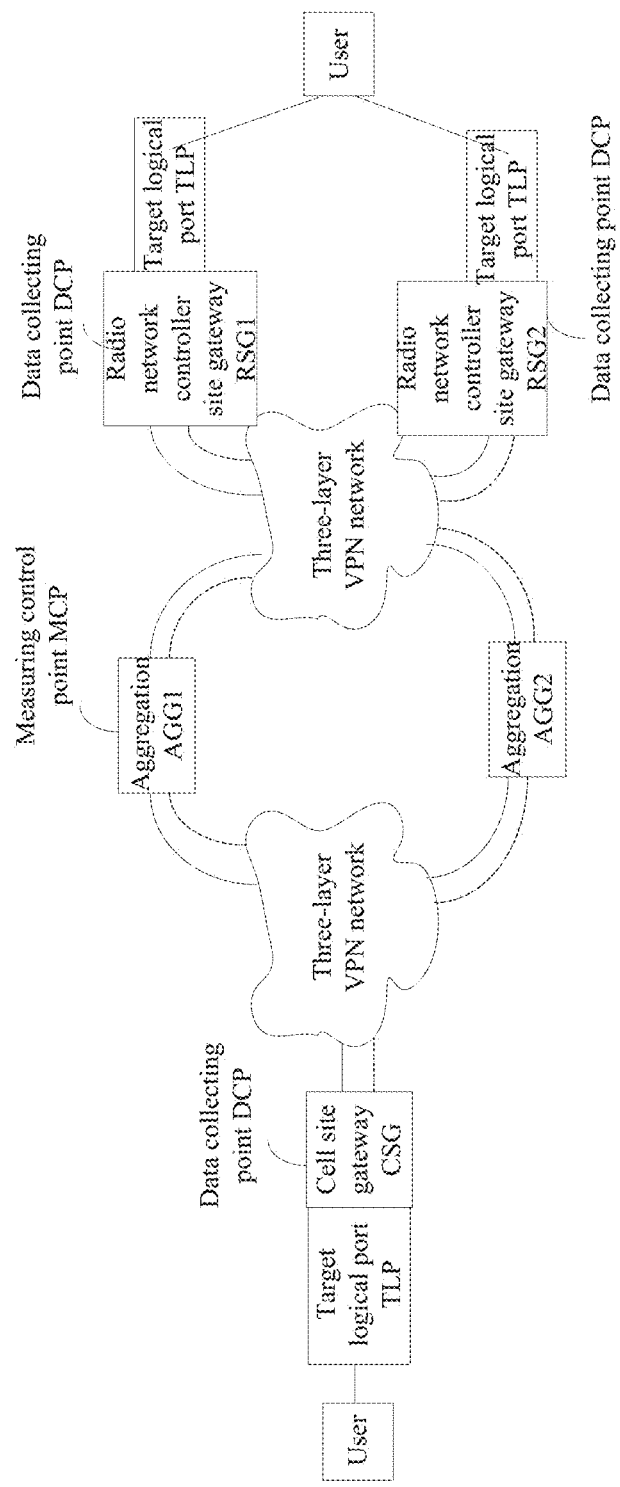
FIG. 14 is a schematic structural diagram of a system for measuring network packet loss according to Embodiment 2 of the present application.

FIG. 14 is a schematic structural diagram of a system for measuring network packet loss according to Embodiment 2 of the present application, with reference to FIG. 14, TLPs are deployed respectively at user sides of an upstream transmitting end device and a downstream receiving end device, DCPs are deployed respectively on the upstream transmitting end device and the downstream receiving end device, with reference to FIG. 14, when the direction of a target traffic stream is from left to right, a cell site gateway (Cell Site Gateway, CSG) is the upstream transmitting end device, a radio network controller site gateway (Radio Network Controller Site Gateway, RSG) is the downstream receiving end device, and there are RSG1 and RSG2 respectively. When the direction of the target traffic stream is reverse, the upstream and downstream are configured reversely, and the specific technical solutions have been described in details in Embodiment 3, and are not repeated here any further. An MCP is deployed on any network element node throughout the network, for example, there are two aggregations (Aggregation, AGG) in FIG. 14, and AGG1 is selected to deploy the MCP. Optionally, the MCP is deployed on a network element node with a stronger function, and the path for transmitting data packet measurement information and the path for transmitting the target traffic stream (marked by solid lines in FIG. 14) respectively perform out-band transmission, such that optional data packet measurement information can be read and transmitted independently. The management network (as shown in FIG. 14, the path of the management network layer is represented in broken lines) can adopt a VPN or a public network provided with IP reachability.

Prior to enabling packet loss measurement, the traffic stream identifying range of the identification module of the TLPs should be defined first according to the measuring instruction of the user, and the traffic message is designated generally according to a five-tuple group, that is, a source IP address, a destination IP address, an IP address prefix, a source protocol port number, and a destination protocol port number, as well as TOS automatic judging information in an IP header, and the implementation principle and method have been described in details in Embodiment 2, and are not repeated here any further.

After a traffic stream enters the upstream TLP on the transmitting end device, the identification module of the upstream TLP identifies and matches the traffic stream according to the defined traffic stream characteristic information, if relevant traffic stream characteristic information in the data packet IP header of the traffic stream is consistent with the traffic stream measurement range of the TLP, the packet loss measurement is enabled on MCP, DCPs and TLPs. The method for measuring network packet loss according to the present application provides several optional measurement period with different durations in advance, such as measurement periods with 5 kinds of durations: 1 s, 3 s, 10 s, 1 min and 1 h, and the DCP, TLP and MCP all adopt time synchronization modules to perform synchronization, optionally, the time synchronization module can be NTP or a 1588v2 clock. By means of the time synchronization module, the upstream TLP on the upstream transmitting end device, the DCP for managing the upstream TLP, the downstream TLP on the downstream receiving end device, the DCP for managing the downstream TLP and the MCP have the same overall seconds. The MCP and DCP can obtain a period number of a measurement characteristic identifying message in one measurement period, according to the overall seconds and the measurement period selected by each traffic stream data packet measurement, and the formula thereof has been described in details in Embodiment 3, and is not repeated here any further.

The upstream TLP adds an identifier to the data packet of the target traffic stream according to the selected measurement period, the principle and method for adding the identifier and the range designated for the identifier have been described in detail in Embodiment 2, and are not repeated here any further.

Then, the upstream TLP initiates a counting module, in particular, the counting module initiates corresponding counter to count with respect to different identifiers, for example, counter 0 counts the data packet with an identifier of 0, while counter 1 counts the data packet with an identifier of 1. Correspondingly, after being received by each downstream TLP, the traffic stream is first identified and matched by the identification module. Upon successful match, similarly, the TLP initiates a counting module according to different identifiers, and transmits the target traffic stream to corresponding counter to count. Optionally, the counters of the upstream TLP and the downstream TLP also can perform byte count, so as to provide accurate traffic information.

The DCP deployed on the transmitting end device reads the data packet transmission information on the upstream TLP corresponding to the previous period in each measurement period, and transmits the data packet transmission information in the measurement period to the MCP, where the data packet transmission information includes a measurement period identifier, a traffic stream identifier, a data packet count value and a TLP identifier of the upstream transmitting end.

The DCP deployed on the receiving end device needs to acquire the data packet reception information on the downstream TLP corresponding to the previous period after delaying with a preset duration by taking the time when the measurement period corresponding to the measurement period identifier arrives as the starting point, reading after delaying a preset duration by the DCP can effectively avoid time delay and jitter of the network, and guarantee accurate reading of the DCP. Optionally, a packet count value of the previous period is extracted at two-thirds of the measurement period at the receiving end. The DCP deployed on the receiving end device performs operations similar to the DCP deployed on the transmitting end device after reading packet count data of one period, and transmits the data packet reception information to the MCP. The packet count data includes a measurement period identifier, a traffic stream identifier, a data packet count value and a TLP identifier of the downstream receiving end.

When the transmitting end and the receiving end need to make statistics to traffic information, corresponding data packet count value also can include a data packet byte statistical value of each measurement period on corresponding TLP read by each DCP.

The MCP maintains a measurement data summary table, and the determination module of the MCP calculates corresponding packet loss number and packet loss ratio after the data packet count values in one measurement period are present, and then packet loss measurement operations of the overall network packet loss measurement system can be completed. The specific calculating formula and the preferable solution on which the maintaining of the measurement data summary table and the calculating of the packet loss number and the packet loss ratio are based have been described in detail in Embodiment 3, and are not repeated here any further. The packet loss measurement operations of the overall packet loss measurement system can be completed.

Figure 15:
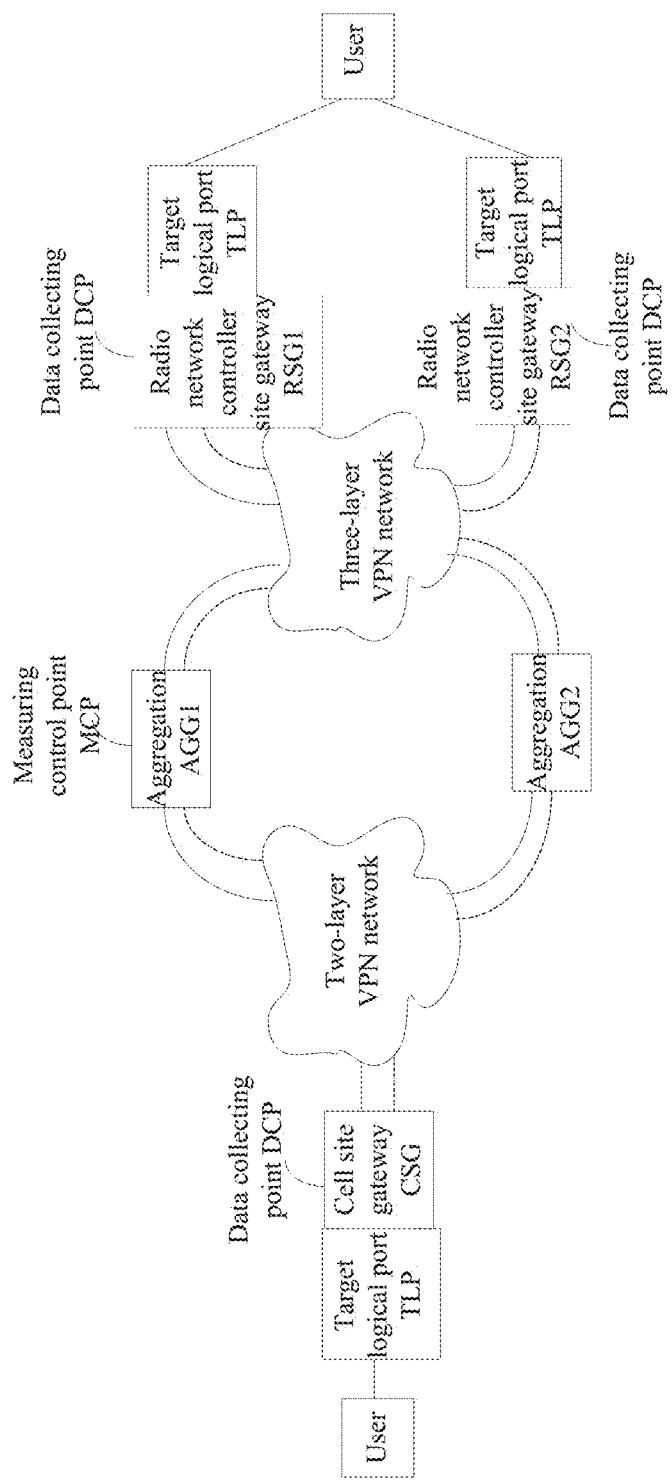
FIG. 15 is a schematic structural diagram of a system for measuring network packet loss according to Embodiment 3 of the present application.

FIG. 15 is a schematic structural diagram of a system for measuring network packet loss according to Embodiment 3 of the present application, on the basis of the system for measuring network packet loss in FIG. 14, some networks are mixed with a two-layer VPN network and a three-layer VPN network, since the two-layer VPN network and the three-layer VPN network have different measurement standards, there is no effective method for measuring packet loss for this network scenario in the prior art, and it can be seen from Embodiment 1 that acquiring and transmitting the data packet measurement information among TLPs, DCPs and MCP in embodiments of the present application are transmitted by a management network to achieve out-band transmission, which can effectively avoid a problem of the data packet measurement information caused by different measurement standards of the two-layer VPN network and the three-layer VPN network when the data packet measurement information is transmitted with the traffic stream.

Figure 16:
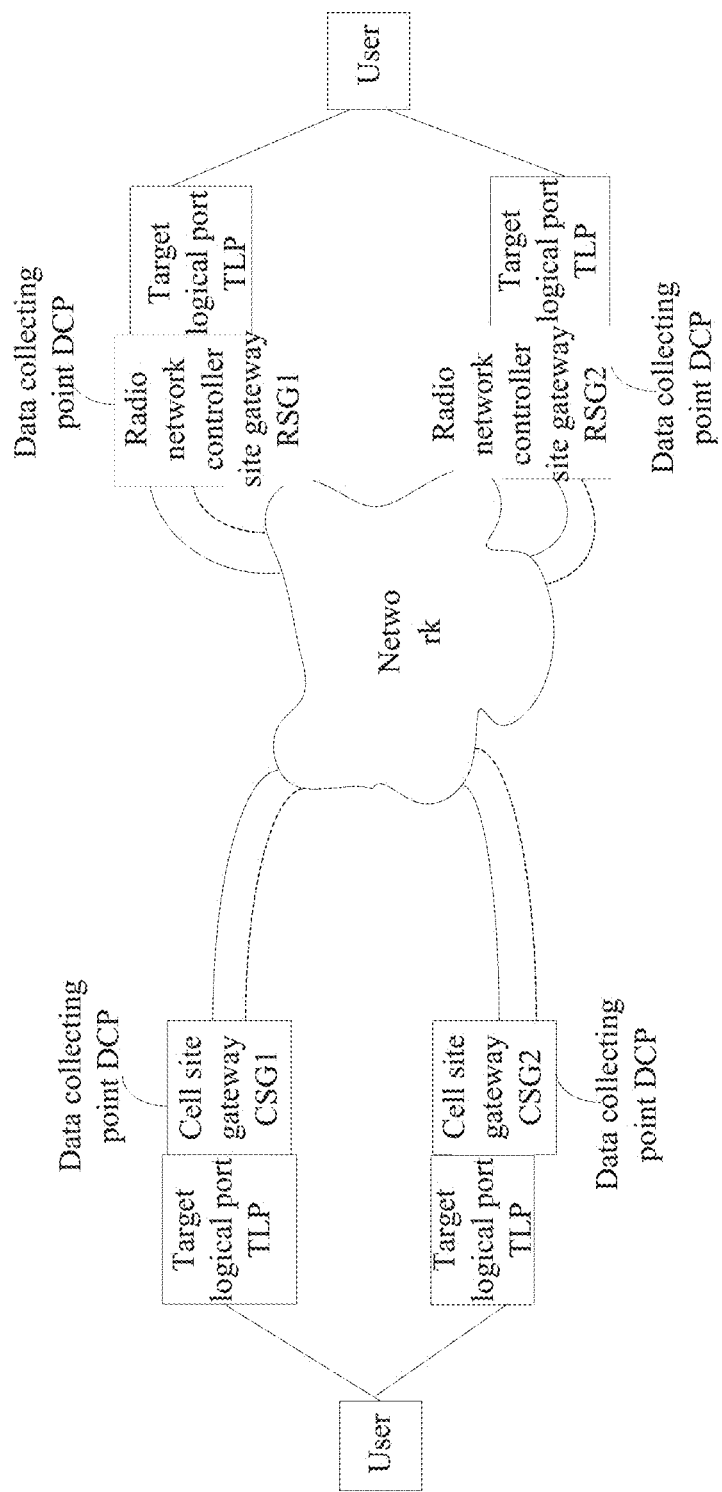
FIG. 16 is a schematic structural diagram of a system for measuring network packet loss according to Embodiment 4 of the present application.

FIG. 16 is a schematic structural diagram of a system for measuring network packet loss according to Embodiment 4 of the present application, on the basis of the system for measuring network packet loss in FIG. 14 or FIG. 15, there is a dual homing access scenario for RSG1 and RSG2 devices at right side of the network, when RSG1 and RSG2 switch paths, since the data packet measurement information according to embodiments of the present application includes a measurement period identifier, a traffic stream identifier, a data packet count value and a TLP identifier, a TLP on a new receiving device can perform packet loss measurement to the data message of the target traffic stream when a handover between RSG1 and RSG2 occurs. For example, the target traffic stream is started from a left user and identified by the TLP on CSG1 for enabling network packet loss measurement, then goes to the TLP on RSG1 through the network, and then the corresponding packet loss measurement of the receiving end is performed by this TLP. When RSG1 fails, the target traffic stream switches to RSG2, and then the TLP on the RSG2 can identify the target traffic stream and continue to perform corresponding packet loss measurement. After the packet loss measurement is enabled, if a handover between CSG1 and CSG2 also occurs, likewise, the TLP on a switched CSG also can perform identification and packet loss measurement to the target traffic stream according to the technical solutions in embodiments of the present application.

Persons skilled in the art may appreciate that, all or partial steps of the above method embodiments can be implemented in by related hardware under the instruction of a program. The program can be stored in a computer readable medium. When the program is executed, the steps in the above method embodiments are performed; the storage medium includes various media capable of storing program codes, such as a read only memory (ROM), a random access memory (RAM), a floppy disk, or an optical disk and the like.

Finally, it should be noted that the above embodiments are merely provided for describing the technical solutions of the present application, but not intended to limit the present application. It should be understood by persons skilled in the art that although the present application has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present application.

What is claimed is:

1. A method for measuring network packet loss, where the method is applied in a target logical port (TLP) on a port of a transmitting device, in a scenario of a point-to-multipoint or a multipoint-to-multipoint network, the method comprising: determining, by the TLP, that a traffic stream is a target traffic stream when traffic stream characteristic information of the traffic stream matches a preset traffic stream characteristic information, where the preset traffic stream characteristic information comprises two or more of a source Internet Protocol (IP) address of the traffic stream, a destination address of the traffic stream, a prefix of an IP address of the traffic stream, a source protocol port number of the traffic stream, or a destination protocol port number of the traffic stream; adding, by the TLP, a measurement period identifier in a data packet of the traffic stream, with the measurement period identifier indicating a measurement period; counting, by the TLP, the data packet of the traffic stream in the measurement period, using a counter corresponding to the measurement period identifier, to acquire a data packet count value corresponding to the measurement period identifier, where the TLP counts data packets of each measurement period identifier with a counter corresponding to the each measurement period identifier; determining, by the TLP, data packet measurement information comprising the measurement period identifier, a traffic stream identifier of the traffic stream, the data packet count value, and a TLP identifier of the TLP.

2. The method according to claim 1, wherein the adding the measurement period identifier in the data packet of the traffic stream, comprises: adding the measurement period identifier on one of: a reserved digit of type of service or (TOS) a reserved digit of Flags in an IP header of the data packet.

3. The method according to claim 1, wherein the determining the traffic stream, comprises: determining the traffic stream according to at least two-tuple information in a five-tuple group.

4. The method according to claim 1, wherein before the determining the traffic stream, the method further comprises: synchronizing a data collecting point (DCP) on the transmitting device with the TLP by using one of a network time protocol or (NTP) an IEEE 1588v2 clock.

5. The method according to claim 1, further comprising: counting data packet bytes of the traffic stream.

6. A method for measuring network packet loss, where the method is applied in a target logical port (TLP) on a port of a receiving device, in a scenario of a point-to-multipoint or a multipoint-to-multipoint network, the method comprises: determining, by the TLP, that a traffic stream received from a upstream TLP is a target traffic stream when traffic stream characteristic information of the traffic stream matches a preset traffic stream characteristic information, where the preset traffic stream characteristic information comprises two or more of: a source Internet Protocol (IP) address of the traffic stream, a destination address of the traffic stream, a prefix of an IP address of the traffic stream, a source protocol port number of the traffic stream, or a destination protocol port number of the traffic stream; counting, by the TLP, using a counter corresponding to a measurement period identifier indicating a measurement period, the data packet of the traffic stream in a unit of the measurement period to acquire a data packet count value corresponding to the measurement period identifier, where the TLP counts data packets of each measurement period identifier with a counter corresponding to the each measurement period identifier; determining, by the TLP, data packet measurement information comprising the measurement period identifier, a traffic stream identifier of the received traffic stream, the data packet count value, and a TLP identifier of the upstream TLP.

7. A non-transitory computer-readable storage medium comprising a program, wherein when the program is executed by the computer, causes the computer to carry out the steps of: determining that a traffic stream is a target traffic stream when traffic stream characteristic information of the traffic stream matches a preset traffic stream characteristic information, where the preset traffic stream characteristic information comprises two or more of: a source Internet Protocol (IP) address of the traffic stream, a destination address of the traffic stream, a prefix of an IP address of the traffic stream, a source protocol port number of the traffic stream, or a destination protocol port number of the traffic stream; counting a data packet of the traffic stream in a measurement period to acquire a data packet count value corresponding to the measurement period identifier indicating the measurement period; determining data packet measurement information comprising the measurement period identifier, a traffic stream identifier of the traffic stream, the data packet count value and a target logical port (TLP) identifier of a TLP.

8. The non-transitory computer-readable storage medium according to claim 7, wherein the TLP is an upstream TLP, and wherein when the program is executed by the computer, causes the computer to carry out the steps of, adding a measurement period identifier in the data packet of the traffic stream according to a current measurement period identifier; counting the data packet with an added different identifier.

9. The non-transitory computer-readable storage medium according to claim 8, wherein the measurement period identifier is carried on a reserved digit of type of service (TOS) or a reserved digit of Flags in an IP header of the data packet.

10. The non-transitory computer-readable storage medium according to claim 7, wherein the TLP is a downstream TLP.

11. The non-transitory computer-readable storage medium according to claim 7, wherein traffic stream characteristic information comprises two-tuple information in a five-tuple group.

12. The non-transitory computer-readable storage medium according to claim 7, wherein when the program is executed by the computer, causes the computer to carry out the steps of, performing time synchronization between a data collecting point (DCP) on the device and the TLP using a network time protocol (NTP) or an IEEE 1588v2 clock.

13. The non-transitory computer-readable storage medium according to claim 7, wherein when the program is executed by the computer, causes the computer to carry out the steps of, generating statistics of data packet byte information of the traffic stream, wherein the DCP transmits data packet byte statistical information to the MCP after acquiring the data packet byte statistical information.

* * * * *